(12) United States Patent
Hatsuzawa et al.

(10) Patent No.: US 11,946,431 B2
(45) Date of Patent: Apr. 2, 2024

(54) ELECTRONICALLY CONTROLLED THROTTLE DEVICE

(71) Applicant: HITACHI ASTEMO, LTD., Hitachinaka (JP)

(72) Inventors: Hidefumi Hatsuzawa, Hitachinaka (JP); Takuya Tanaka, Hitachinaka (JP); Takafumi Saito, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 18/002,315

(22) PCT Filed: Jul. 6, 2021

(86) PCT No.: PCT/JP2021/025497
§ 371 (c)(1),
(2) Date: Dec. 19, 2022

(87) PCT Pub. No.: WO2022/009895
PCT Pub. Date: Jan. 13, 2022

(65) Prior Publication Data
US 2023/0243312 A1 Aug. 3, 2023

(30) Foreign Application Priority Data
Jul. 9, 2020 (JP) ................. 2020-118587

(51) Int. Cl.
*F02D 9/10* (2006.01)
(52) U.S. Cl.
CPC ................. *F02D 9/1065* (2013.01)

(58) Field of Classification Search
CPC .......... F02D 9/1065; F02D 9/02; H02K 23/66
(Continued)

(56) References Cited

U.S. PATENT DOCUMENTS

| | | | |
|---|---|---|---|
| 9,583,995 B2* | 2/2017 | Yamaguchi | .......... H02K 13/006 |
| 9,692,278 B2* | 6/2017 | Buerger | .............. H02K 11/026 |
| 2002/0105246 A1 | 8/2002 | Ooyama | |

FOREIGN PATENT DOCUMENTS

| | | |
|---|---|---|
| JP | 2000-184661 A | 6/2000 |
| JP | 2002-315274 A | 10/2002 |

(Continued)

OTHER PUBLICATIONS

International Search Report with English Translation and Written Opinion of International Application No. PCT/JP2021/025497 dated Sep. 14, 2021.

*Primary Examiner* — Hai H Huynh
(74) *Attorney, Agent, or Firm* — Foley & Lardner LLP

(57) ABSTRACT

Provided is an electronically controlled throttle device configured to reduce size of a motor and concurrently to enhance reduction of a noise of the motor. The electronically controlled throttle device includes: a body including a throttle valve; a motor provided with a brush, the motor configured to drive the throttle valve; a bracket (20F) configured to attach the motor to the body; a pigtail connected electrically to the brush, and arranged on a surface of the bracket (20F), the surface facing the motor; and a filter circuit (an inductor (31), a capacitor (32), and a resistor (33)) connected electrically to the pigtail and configured to reduce the noise of the motor. The filter circuit is arranged on a surface of the bracket (20F), the surface opposite the motor.

6 Claims, 6 Drawing Sheets

(58) Field of Classification Search
USPC .......................... 123/399, 336, 337; 701/103
See application file for complete search history.

(56) References Cited

FOREIGN PATENT DOCUMENTS

| | | |
|---|---|---|
| JP | 2003-189542 A | 7/2003 |
| JP | 2013-155650 A | 8/2013 |
| JP | 2017-208947 A | 11/2017 |

* cited by examiner

ELECTRONICALLY CONTROLLED THROTTLE DEVICE

TECHNICAL FIELD

The present invention relates to an electronically controlled throttle device.

BACKGROUND ART

JP 2013-155650 A discloses an electronically controlled throttle body having a motor in which an inductor is mounted. Specifically, a conductive path is divided and exposed in its middle, the conductive path between a pair of terminals of the motor connected to a gear cover and a pair of terminals connected to a brush of the motor. Then, each of the two divided conduct paths has a pair of ends, to which one end and the other end of a corresponding one of two inductors are connected.

The inductor is configured to reduce fluctuation of current per unit time by using inductance, so as to reduce radiation noise. Concurrently, the inductor is configured to suppress generation of radio frequency noise at time of switching. Accordingly, the inductor is selected in a size mountable inside the motor.

CITATION LIST

Patent Literature

PTL 1: JP 2013-155650 A

SUMMARY OF INVENTION

Technical Problem

However, lately, with a demand for smaller size of a valve device, and a decrease in size of a motor accompanied with the demand, the motor has less space therein and thus, an inductor having a sufficient capacity is not mountable inside the motor.

An object of the present invention is to provide an electronically controlled throttle device configured to reduce size of a motor and concurrently configured to enhance reduction of a noise of the motor.

Solution to Problem

In order to achieve the object, the present invention provides an electronically controlled throttle device including: a body including a throttle valve; a motor provided with a brush, the motor configured to drive the throttle valve; a bracket configured to attach the motor to the body; a pigtail connected electrically to the brush, and arranged on a surface of the bracket, the surface facing the motor; and a filter circuit connected electrically to the pigtail, and configured to reduce a noise of the motor. In the electronically controlled throttle device, the filter circuit is arranged on a surface of the bracket, the surface opposite the motor.

Advantageous Effects of Invention

An electronically controlled throttle device according to the present invention is effective in reducing size of a motor and in enhancing reduction of a noise of the motor. Problems, configurations, and effects in addition to those described above will be clarified below in descriptions of embodiments.

DESCRIPTION OF EMBODIMENTS

An embodiment according to the present invention will be described with reference to the drawings.

This embodiment relates to a valve body, an electronically controlled throttle body, a motor-driven throttle body, and a valve device, each configured to adjust a flow rate of a fluid in an internal combustion engine. More particularly, this embodiment relates to a motor-driven valve device having a direct current (DC) motor as an actuator, the DC motor driving based on a pulse width modulator (PWM) signal as a rectangular wave pulse signal. The motor-driven valve device includes an inductor for reducing radiation noise.

For example, the motor-driven valve device of this embodiment is an electronically controlled throttle device, is attached to an intake passage of the internal combustion engine, and is configured to variably control a cross-sectional area of the intake passage, so as to adjust an amount of an intake air into a cylinder in a gasoline engine vehicle or control a pressure in an intake pipe in a diesel engine.

With the gasoline engine vehicle, the electronically controlled throttle device may be used for either a typically called in-cylinder direct fuel injection engine for injecting fuel directly into the cylinder or a typically called port injection engine for injecting the fuel into the intake pipe.

While partially duplicating the object of the present invention, an object of this embodiment is, for example, to increase a value of inductance within a limited space of the electronically controlled throttle device as the valve device.

(Embodiment)

A configuration of the electronically controlled throttle device of this embodiment will be described with reference to FIGS. 1 to 6.

Figure 1:
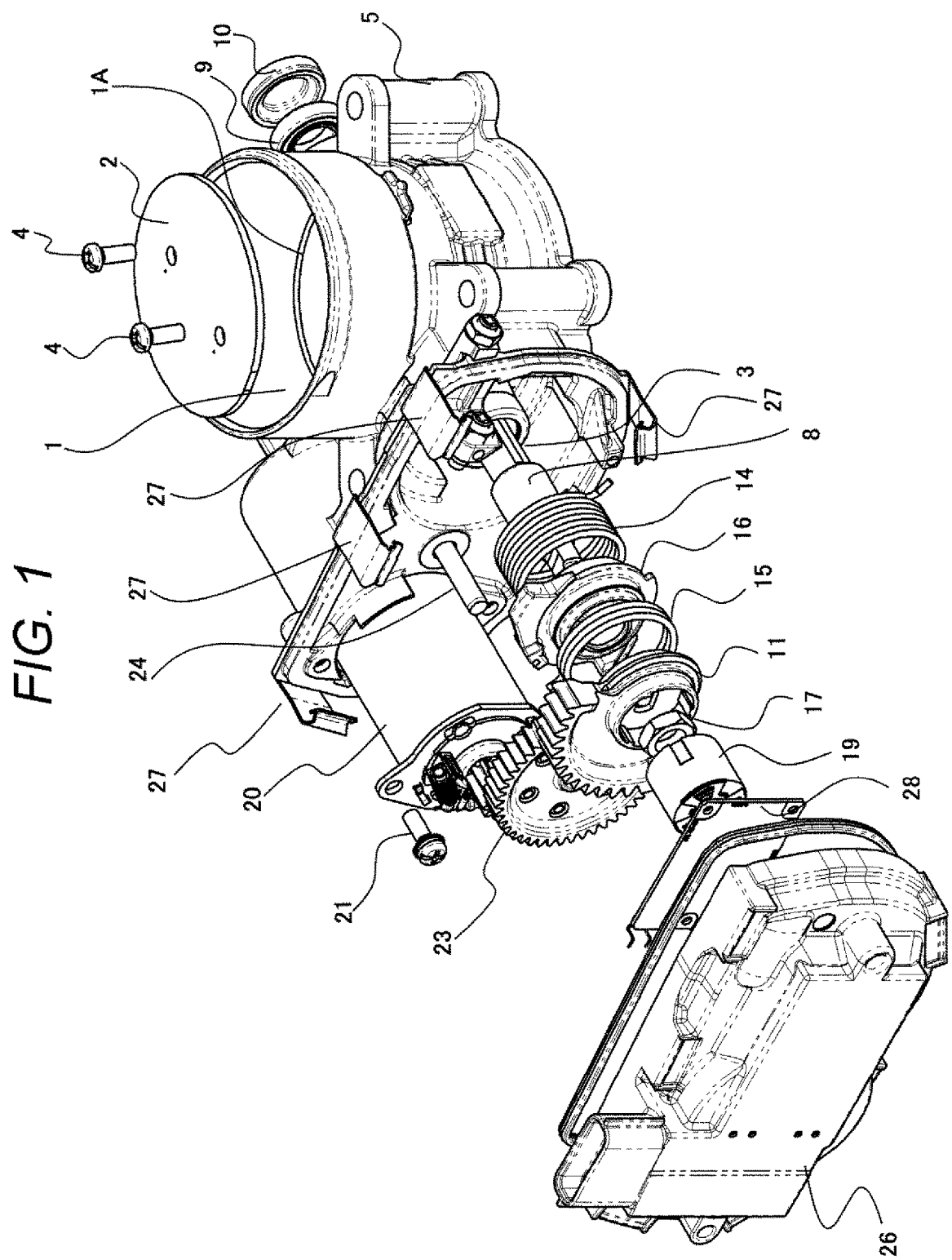
FIG. 1 is an exploded perspective view of a motor-driven electronically controlled throttle device in a gasoline engine vehicle.
Figure 2:
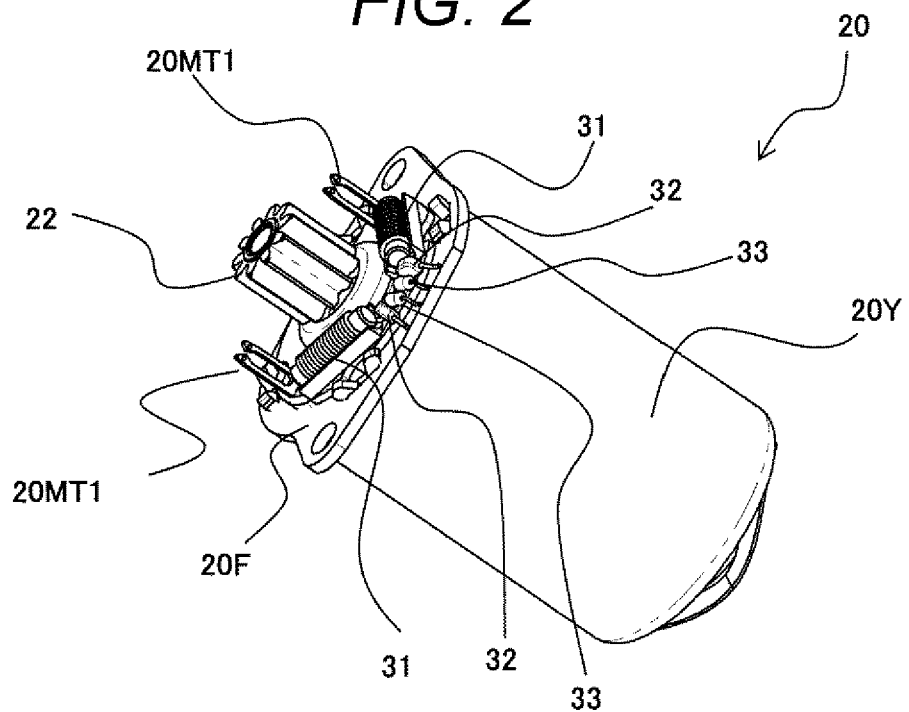
FIG. 2 is a perspective view of a motor in the electronically controlled throttle device.

As illustrated in FIG. 1, the electronically controlled throttle device controls the amount of the intake air by causing the DC motor (hereinafter, referred to as a motor 20) controlled based on the PWM control to drive throttle valve (hereinafter, referred to as a throttle valve 2) in an intake passage 1 through which air is supplied to an engine. The motor 20 is attached to a motor housing 20A that is formed integrally with a throttle body 5.

Figure 6:
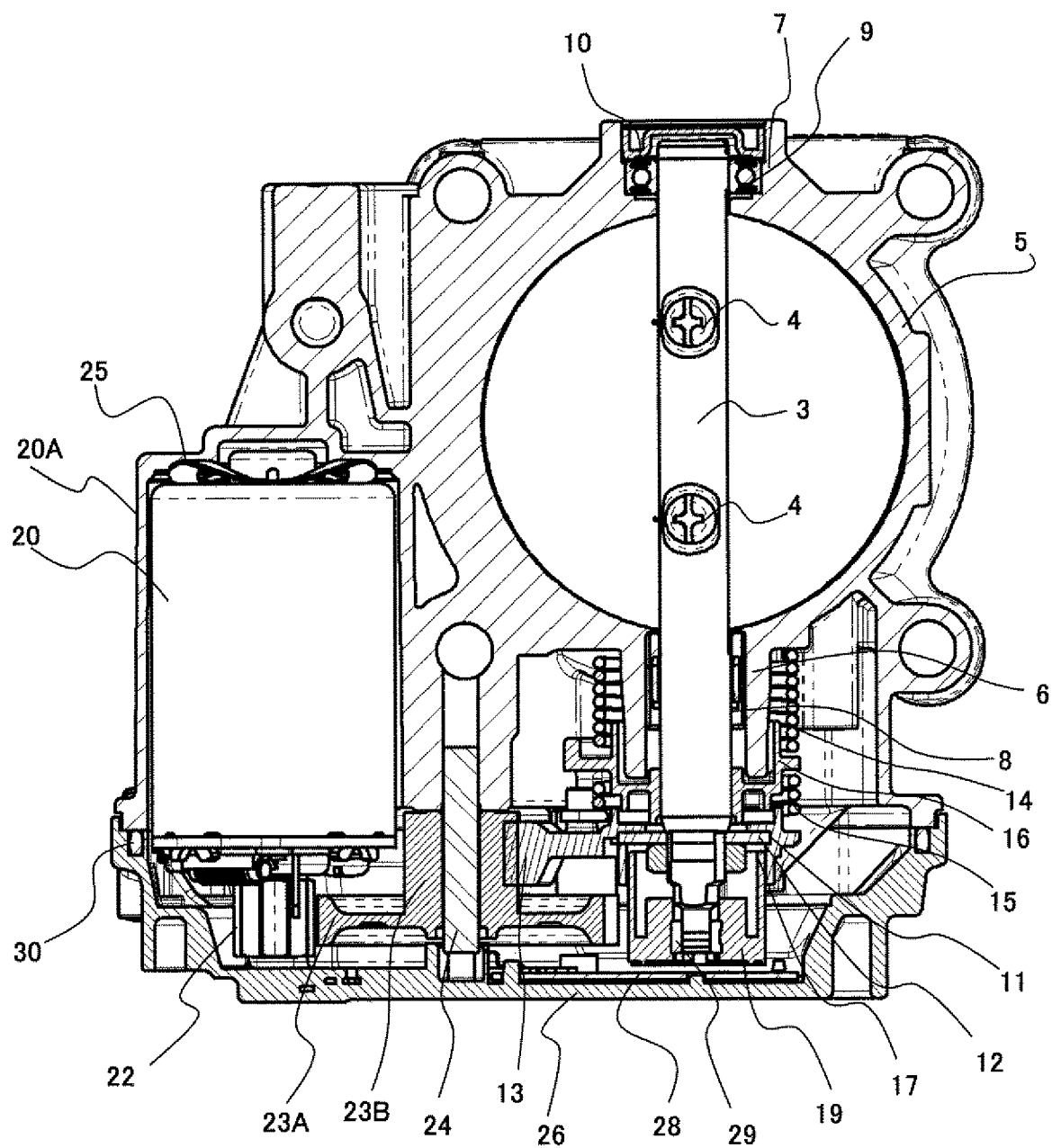
FIG. 6 is a cross-sectional view of the motor-driven electronically controlled throttle device in the gasoline engine vehicle.

As illustrated in FIG. 6, the throttle body 5 has, on one surface, a reduction gear mechanism (22, 23A, 23B, and 13) arranged, the reduction gear mechanism (22, 23A, 23B, and 13) being configured to transmit rotational force of the motor 20 to a rotational shaft (hereinafter, referred to as a throttle shaft 3) of the throttle valve 2, and the throttle body 5 has a cover 26 fixed thereto, the cover configured to cover the reduction gear mechanism (22, 23A, 23B, and 13). The cover 26 includes a resin connector having positive and negative electric terminals (not illustrated) to supply electric power to the motor 20.

An inductor holder 31H (FIG. 4) is integrally molded with a resin portion of a brush holder 20BH (FIG. 3) for holding a brush 20BR (FIG. 5) of the motor 20.

Figure 4:
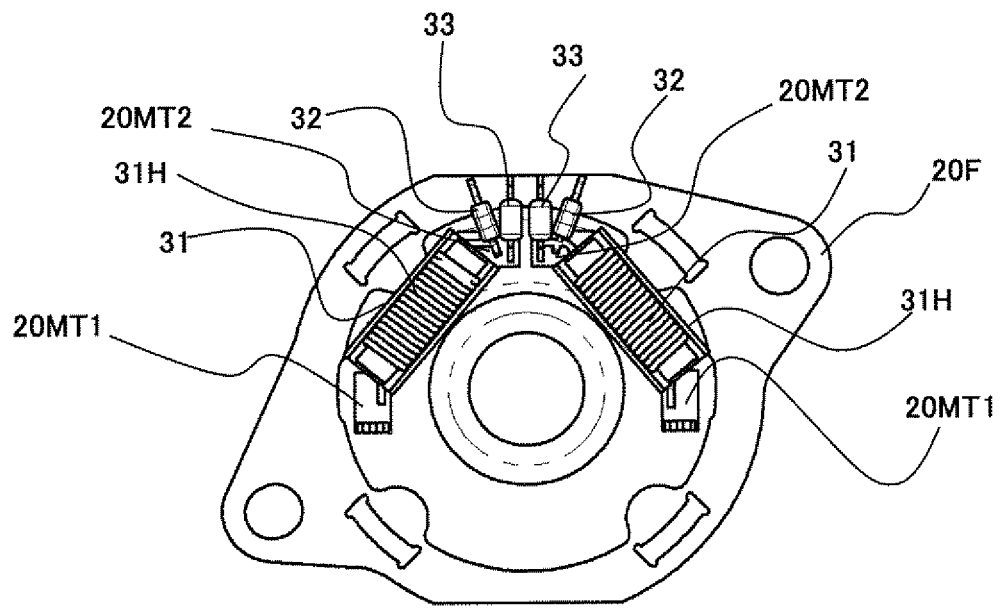
FIG. 4 is a plan view of a brush holder of the motor in the electronically controlled throttle device when viewed from the front.

As illustrated in FIG. 4, the inductor holder 31H is disposed between a motor external connection terminal 20MT1 and a motor internal connection terminal 20MT2. The motor external connection terminal 20MT1 is connected to a terminal on the cover 26, and the motor internal connection terminal 20MT2 is connected to a pigtail 20PG (FIG. 5) inside the motor 20 as a connector to the motor brush 20BR.

In this embodiment, the electronically controlled throttle device includes: the throttle body 5 (body) including the throttle valve 2; the motor 20 provided with the motor brush 20BR (brush), the motor 20 configured to drive the throttle valve 2; a bracket 20F configured to attach the motor 20 to the throttle body 5; the pigtail 20PG connected electrically to the motor brush 20BR (brush) and arranged on a surface of the bracket 20F, the surface facing the motor 20; and a filter circuit (inductor 31, capacitor 32, resistor 33) connected electrically to the pigtail 20PG and configured to reduce a noise of the motor 20. The filter circuit is arranged on a surface of the bracket, the surface opposite the motor 20. With this configuration, the inductor 31 in larger size is provided outside the motor 20. Thus, capacitance of the inductor 31 is increased.

The inductor 31 is fixed to the inductor holder 31H with an adhesive.

As with the inductor 31 connected to the motor internal connection terminal 20MT2, the resistor 33 and the capacitor 32 are connected to the motor internal connection terminal 20MT2 and are grounded through the bracket 20F, so that the resistor 33 and the capacitor 32, together with the inductor 31, effectively reduce the noise.

Here, when the capacitor 32 is connected to the motor internal connection terminal 20MT2 frontward of the inductor 31 with respect to the motor 20 (pigtail 20PG), a length of wiring line carrying the noise is shorter and the noise is thus more effectively reduced than when the capacitor 32 is connected to the motor external connection terminal 20MT1 rearward of the inductor 31 with respect to the motor 20 (pigtail 20PG).

In this state, the resistor 33 and the capacitor 32 may be mounted on either the surface of the bracket 20F facing the motor (surface illustrated in FIG. 5) or the surface of the bracket 20F opposite the motor (surface illustrated in FIG. 4).

In other words, in this embodiment, as illustrated in FIG. 4, the filter circuit includes the capacitor 32 connected electrically to the pigtail 20PG and the resistor 33 connected electrically to the pigtail 20PG. The capacitor 32 and the resistor 33 are arranged on the surface of the bracket 20F facing the motor 20, but may alternatively be arranged on the surface of the bracket 20F opposite to the motor 20.

Figure 3:
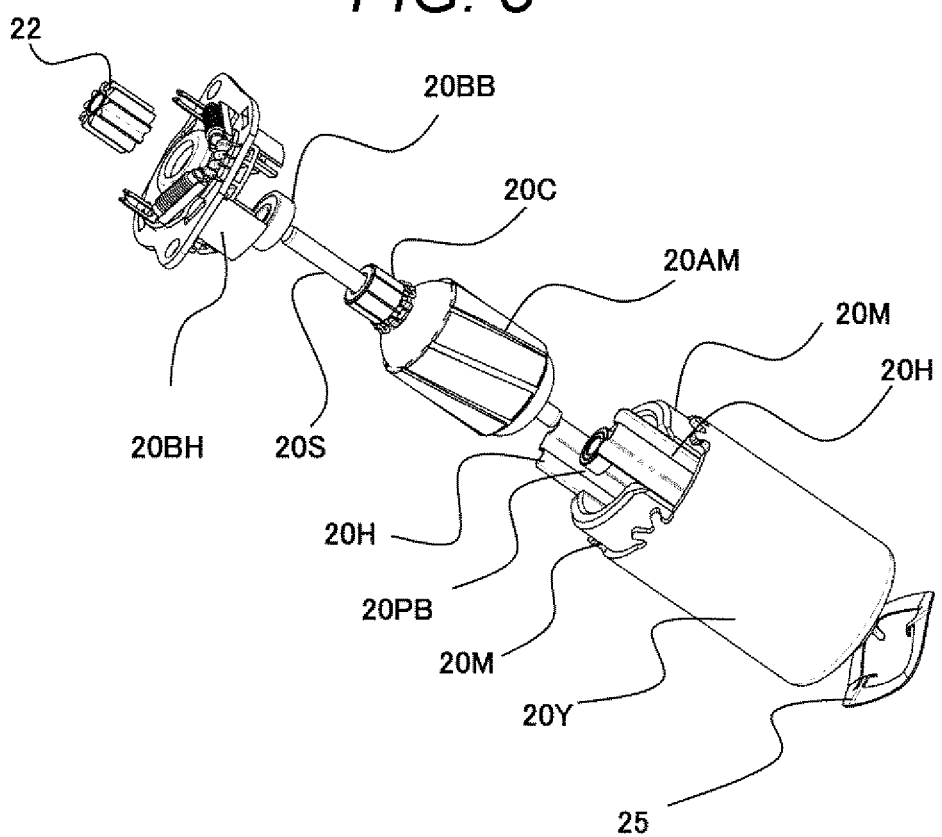
FIG. 3 is an exploded perspective view of the motor in the electronically controlled throttle device.
Figure 5:
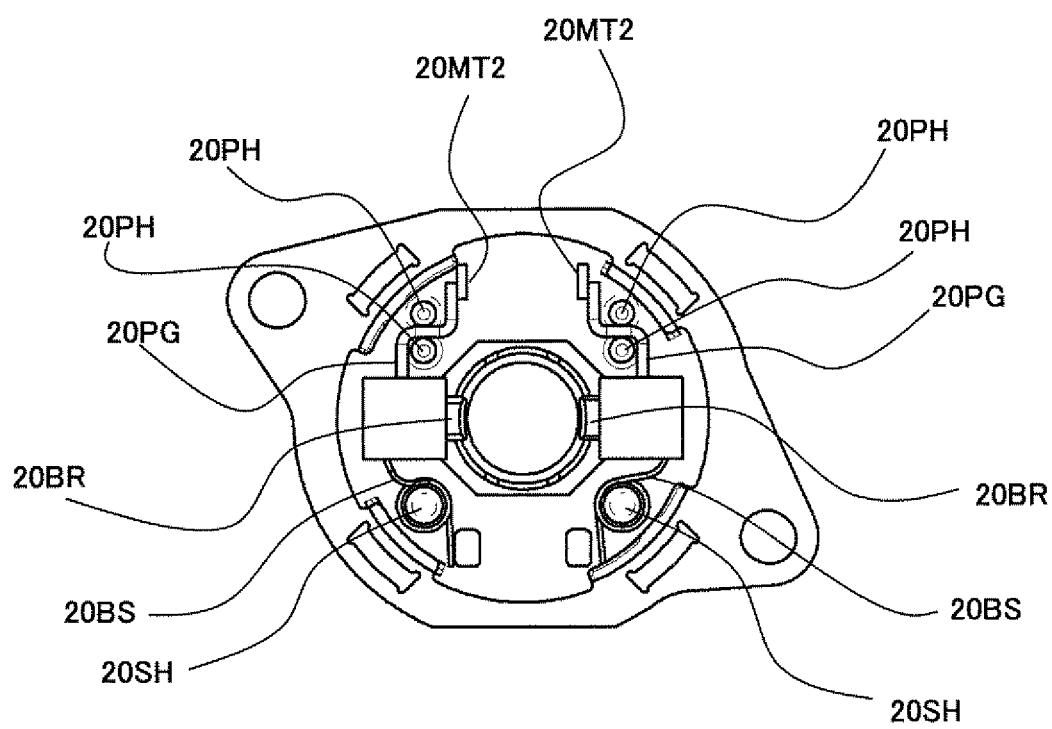
FIG. 5 is a plan view of the brush holder of the motor in the electronically controlled throttle device when viewed from the rear.

As illustrated in FIG. 5, a spring holder 20SH is disposed on the brush holder 20BH, and the motor spring 20BS held by the spring holder 20SH presses the motor brush 20BR in a direction of a motor shaft 20S (FIG. 3). On the brush holder 20BH, a pigtail holder 20PH is disposed to hold the pigtail 20PG that is configured to connect the motor brush 20BR to the motor internal connection terminal 20MT2. The pigtail 20PG needs to move as the motor brush 20BR wears, and thus is kept to a length allowable for the movement.

As illustrated in FIG. 3, the brush holder 20BH holds a ball bearing 20BB for supporting one end of the motor shaft 20S. The motor shaft 20S has a commutator 20C and an armature 20AM fixed thereto.

The brush holder 20BH is fixed to a cylindrical yoke 20Y. Here, the cylindrical yoke 20Y has one side to which the brush holder 20BH is held, and has the other side to which a plane bearing 20PB is held, the plane bearing 20PB supporting the other end of the motor shaft 20S.

In the cylindrical yoke 20Y, a magnet 20M is held by a magnet stay 20H.

Next, an example where the motor described above is applied to the electronically controlled throttle device in the gasoline engine vehicle will be specifically described with reference to FIGS. 1 to 8. The configuration of the electronically controlled throttle device will be described in detail below.

As illustrated in FIG. 6, a throttle valve assembly made of die-cast aluminum (throttle body 5) is integrally molded with the intake passage 1 (hereinafter, referred to as a bore portion 1A) and the motor housing 20A for accommodating the motor 20.

In the throttle body 5, a rotational shaft of metal (hereinafter, referred to as the throttle shaft 3) is disposed along one diameter line of the bore portion 1A. The throttle shaft 3 is rotatably supported at its both ends by needle bearings as bearings 8 and 9. The bearings 8 and 9 are respectively press-fitted and fixed to bearing boss portions 6 and 7 in the throttle body 5.

Having been press-fitted to the throttle shaft 3, the bearing 9 is press-fitted to the throttle body 5. Subsequently, the bearing 9 is pressed by a cap 10 that is press-fitted to the throttle body 5. With this configuration, a movable amount of the throttle shaft 3 is restricted in its axial direction. Here, the throttle shaft 3 is rotatably supported with respect to the throttle body 5.

With the throttle shaft 3, a throttle valve formed of a metal disk (hereinafter, referred to as the throttle valve 2) is inserted in a slit of the throttle shaft 3, and fixed to the throttle shaft 3 with a screw 4. Accordingly, as the throttle shaft 3 rotates, the throttle valve 2 rotates, causing the cross-sectional area of the intake passage 1 to change. With this configuration, a flow rate of the intake air into the engine is controlled.

Figure 7:
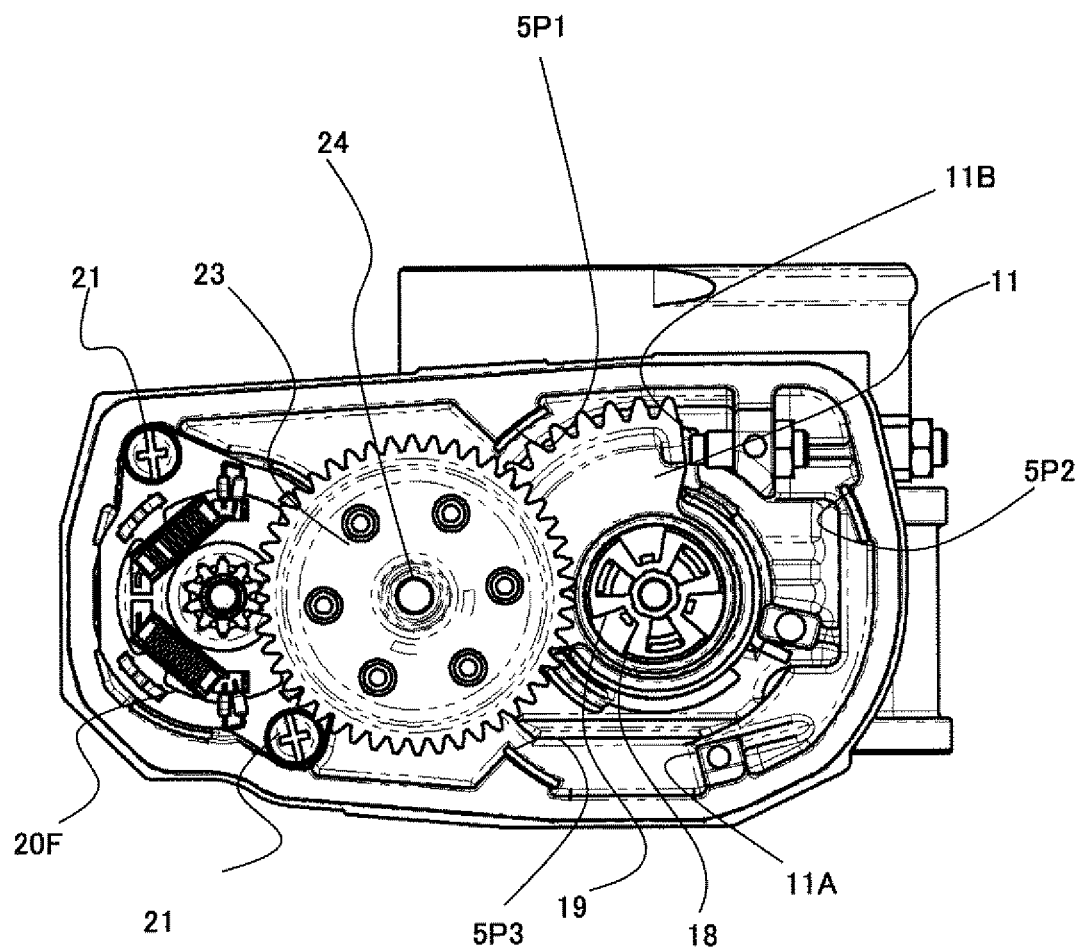
FIG. 7 is a plan view of the motor-driven electronically controlled throttle device used in the gasoline engine vehicle, the electronically controlled device from which a gear cover is removed.

As illustrated in FIGS. 6 and 7, the motor housing 20A is arranged substantially in parallel with the throttle shaft 3, the motor 20 configured with the DC motor provided with the brush is inserted in the motor housing 20A, and the motor 20 is fixed by having a flange of the bracket 20F (FIG. 7) screwed to a side wall of the throttle body 5 with a screw 21. As illustrated in FIG. 6, the motor 20 has, at its end, a wave washer 25 to hold the motor 20.

As illustrated in FIG. 6, an opening of the bearing boss portion 6 is sealed with the bearing 8, and an opening of the bearing boss portion 7 is sealed with the cap 10, thereby resulting in a shaft sealing portion to maintain the airtightness. The cap 10 for the bearing boss portion 7 protects an end of the throttle shaft 3 and the bearing 9 from being exposed. This configuration prevents air from the bearings 8 and 9 or grease for lubricating the bearings 8 and 9 from leaking into the outside air or into a sensor chamber as will be described later.

At an end of the rotational shaft of the motor 20, a gear 22 is fixed. The gear 22 is made of metal and has the smallest number of teeth. On a side surface of the throttle body, on which the gear 22 is arranged, the reduction gear mechanism and a spring mechanism are collectively disposed to rotationally drive the throttle shaft 3. These mechanisms are covered with the cover (hereinafter, referred to as a gear cover) 26 that is formed of a resin material and fixed to the side surface of the throttle body 5.

As illustrated in FIG. 6, a throttle gear 11 is fixed to the end of the throttle shaft 3 near the gear cover 26. The throttle gear 11 includes a metal plate 12, and a resin gear portion 13 that is resin molded with the metal plate 12. The resin gear portion 13 is integrally molded with the metal plate 12 by resin molding.

The metal plate 12 has, at its center, a hole. With a tip of the throttle shaft 3 inserted into the hole of the metal plate 12, and with a nut 17 screwed into a screw portion, the metal plate 12 is fixed to the throttle shaft 3. The metal plate 12, together with the resin gear portion 13 molded with the metal plate 12, rotates integrally with the throttle shaft 3.

A default spring 15 is formed of a helical spring and is sandwiched between a rear surface of the throttle gear 11 and a default lever 16. Concurrently, a return spring 14 formed of the helical spring is sandwiched between the rear surface of the default lever 16 and the side surface of the throttle body 5. These two springs, i.e., the return spring 14 and the default spring 15, respectively pull in an opening direction and a closing direction to create a default mechanism. With the default mechanism, when the motor 20 is powered off, the throttle valve 2 has its opening degree regulated to be a predetermined opening degree (hereinafter, referred to as a default opening degree).

This embodiment relates to a throttle valve control device in the gasoline engine vehicle, and an initial position of the throttle valve 2 (i.e., a position of the throttle valve 2 when the motor 20 is powered off) is predetermined as the default opening degree. Accordingly, when the throttle valve 2 is held at an opening degree greater than the default opening degree, the return spring 14 causes a load on the throttle valve 2 towards the closing direction, and when the throttle valve 2 is held at an opening degree smaller than the default opening degree, the default spring 15 causes the load on the throttle valve 2 toward the opening direction.

Between the gear 22 fixed to the rotational shaft of the motor 20 and the throttle gear 11 fixed to the throttle shaft 3, an intermediate gear 23 (FIG. 7) is rotatably supported by a gear shaft 24 and engaged with the gear 22 and the throttle gear 11. The gear shaft 24 is made of metal, and press-fitted and fixed to the side surface of the throttle body 5. As illustrated in FIG. 6, the intermediate gear 23 includes a large-diameter gear 23A engaged with the gear 22, and a small-diameter gear 23B engaged with the throttle gear 11. Both gears 23A and 23B are integrally molded by resin molding. The gears 22, 23A, 23B, and 11 configure the reduction gear mechanism with two stages. The rotation of the motor 20 is transmitted to the throttle shaft 3 via the reduction gear mechanism.

Here, in order to prevent interference with the gear 23A, the inductor 31 is mounted at a position opposite the gear 23A with respect to the motor shaft 20S. In this state, at least one of the pigtails 20PG in the motor 20 is disposed opposite the gear 23A with respect to the motor shaft 20S, so that the inductor 31 and the corresponding pigtail 20PG are disposed to overlap each other across the bracket 20F.

In other words, the filter circuit is disposed to overlap the pigtail 20PG across the bracket 20F in an axial direction of the motor 20. Specifically, the filter circuit includes the inductor 31 connected electrically to the pigtail 20PG, and the inductor 31 is disposed to overlap the pigtail 20PG across the bracket 20F in the axial direction of the motor 20.

The electronically controlled throttle device includes the gear 22 (first gear) attached to one end of the shaft of the motor 20, the throttle shaft 3 to which the throttle valve 2 is attached, the throttle gear 11 (second gear) attached to one end of the throttle shaft 3, and the intermediate gear 23 (third gear) configured to transmit rotation of the gear 22 (first gear) to the throttle gear 11 (second gear). The inductor 31 is located opposite the intermediate gear 23 (third gear) across the shaft of the motor 20. Here, the inductor 31 is located apart from the intermediate gear 23. Thus, it is possible to increase the size of the inductor 31 without causing the interference between the inductor 31 and the intermediate gear 23.

Figure 8:
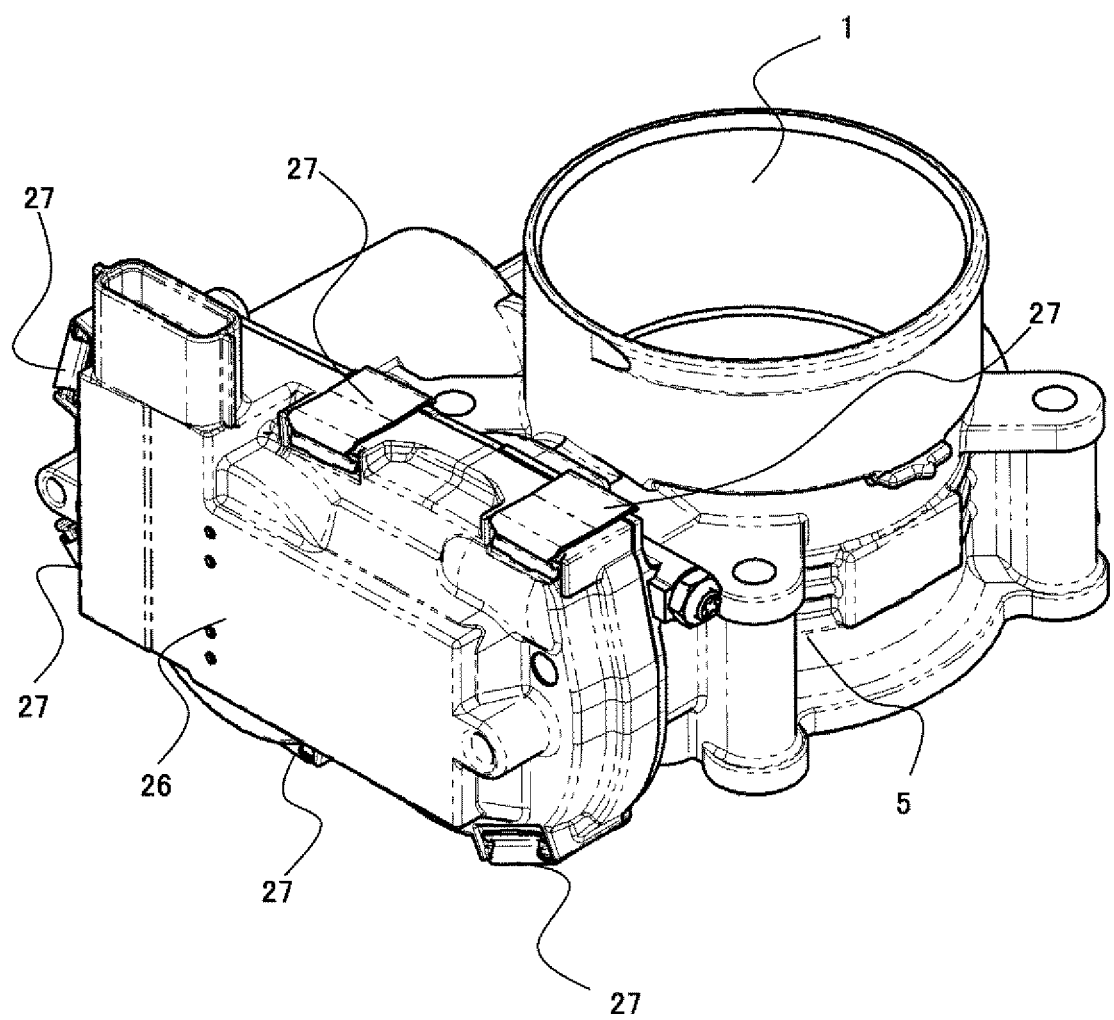
FIG. 8 is an external perspective view of the motor-driven electronically controlled throttle device used in the gasoline engine vehicle.

The reduction mechanism and the spring mechanism are covered with the gear cover 26 formed of the resin material. The gear cover 26 has, at a peripheral edge of its opening end, a groove into which a sealing member 30 is to be inserted. With the groove to which the sealing member 30 is attached, when the gear cover 26 is mounted to the throttle body 5, the sealing member 30 is adhesively attached to an end surface of a frame around a gear housing chamber on the side surface of the throttle body 5. With this configuration, the gear housing chamber is shielded from the outside air. As illustrated in FIG. 8, in this state, the gear cover 26 is fixed to the throttle body 5 with six clips 27.

Next, a rotation angle detection device, in other words, a throttle sensor will be specifically described below. The rotation angle detection device, i.e., the throttle sensor, is located between the reduction gear mechanism configured as above and the gear cover 26 for covering the reduction gear mechanism.

As illustrated in FIG. 6, a resin holder 19 is press-fitted and fixed by an inserter 29 to the end of the throttle shaft 3 near the gear cover. The resin holder 19 has, at its tip plane, a conductor 18 (FIG. 7) (as a pressed conductor) formed integrally thereto. Accordingly, when the motor 20 rotates and the throttle valve 2 rotates too, the conductor 18 is to rotate integrally.

The gear cover 26 has a TPS board 28 (FIG. 6) fixed thereto at a position opposing the conductor 18. On the TPS board 28, an application specific integrated circuit (ASIC) is disposed to detect an angle of the conductor 18, based on which the opening degree of the throttle valve 2 is detected. Then, the opening degree of the throttle valve 2 is supplied as a sensor output to an ECU.

The throttle body 5 has three walls as walls 5P1 to 5P3 for positioning the gear cover 26. When a protrusion of the gear cover 26, the protrusion for positioning the gear cover 26, is engaged with each of the walls 5P1 to 5P3, the conductor 18 as a rotary object is positioned to the TPS board 28. With this configuration, it is possible to output a signal required within an allowable range. A full-open stopper 11A mechanically determines a full-open position of the throttle gear 11, and includes a protrusion formed integrally to the side wall of the throttle body.

The throttle gear 11 has its cutout terminal end abutting the protrusion of the full-open stopper 11A, so that the throttle shaft 3 does not rotate beyond the full-open position.

A full-close stopper 11B restricts a full-close position of the throttle shaft 3, and at the full-close position, the other terminal end of the throttle gear 11 collides with the full-close stopper 11B, so that the throttle shaft 3 does not rotate beyond the full-close position.

As has been described above, with a throttle valve control device to which the inductor mounting structure according to the present invention is adapted, it is possible to reduce the radiation noise.

With the electronically controlled throttle device according to this embodiment, the motor 20 is reduced in size while the noise of the motor 20 is increasingly reduced.

It should be noted that the present invention is not limited to the foregoing embodiment, and various modifications may be included. For example, a detailed description of the foregoing embodiment is to be considered in all respects as merely illustrative for convenience of description, and thus is not restrictive. Additionally, a configuration of an embodiment may be partially replaced with and/or may additionally include a configuration of other embodiments. Further, any addition, removal, and replacement of any other configurations may be partially made to, from, and with the configuration in each of the foregoing embodiments.

Note that, the embodiments of the present invention may have aspects below.

(1). An electronically controlled throttle device includes: a body including a throttle valve; a motor provided with a brush; a bracket that is in contact with the motor and is connected to the body; and a circuit element configured to suppress noise transmitted from the motor. In the electronically controlled throttle device, the bracket has a pigtail connected to the brush and arranged on a side facing the motor, and when viewed in an axial direction of a rotational shaft of the motor, the circuit element is arranged on a side opposite the motor across the pigtail and is disposed to overlap the pigtail.

(2). With the electronically controlled throttle device according to (1), the circuit element includes an inductor, a capacitor, and a resistor.

(3). With the electronically controlled throttle device according to (2), the circuit element overlapping the pigtail corresponds to the inductor.

(4). With the electronically controlled throttle device according to (3), each of the capacitor and the resistor is disposed closer to an armature coil than the inductor.

(5). With the electronically controlled throttle device according to (4), each of the capacitor and the resistor is disposed opposite the armature coil with respect to the bracket that is in contact with the motor.

(6). With the electronically controlled throttle device according to (4), each of the capacitor and the resistor is disposed facing the armature coil with respect to the bracket that is in contact with the motor.

As has been described above, the inductor is mounted not inside the motor but opposite the coil of the motor with respect to the bracket configured to fix the motor to the valve device, in other words, mounted outside the motor.

With the electronically controlled throttle device according to any one of (1) to (6), more space is secured than inside the motor, so that it is possible to mount an inductor that is increased in inductance, and thus, the inductor, having capacity sufficient to reduce the radiation noise of the motor, is to be mounted.

REFERENCE SIGNS LIST 1A bore portion
1B bore portion
2 throttle valve
3 throttle shaft
4 screw
5 throttle body
5P1 wall
5P2 wall
5P3 wall
5S fitting portion
6 bearing boss portion
7 bearing boss portion
8 bearing
9 bearing
10 cap
11 throttle gear
11G groove
11W window
11B full-close stopper
12 metal plate
13 resin gear portion
14 return spring
15 default spring
16 default lever
17 nut
17P protrusion
18 conductor
19 resin holder
20 motor
20A motor housing
20F bracket
21 screw
22 gear
23 intermediate gear
23A large-diameter gear
23B small-diameter gear
24 gear shaft
25 wave washer
26 gear cover
27 clip
28 TPS board
29 inserter
30 sealing member
20BR motor brush
20BH brush holder
31 inductor
32 capacitor
33 resistor
20MT1 motor external connection terminal
20MT2 motor internal connection terminal
20SH spring holder
20S motor shaft
20BB ball bearing
20PB plane bearing
20AM armature
20C commutator
20Y cylindrical yoke
20H magnet stay
20M magnet
20PG pigtail
20PH pigtail holder

The invention claimed is:

1. An electronically controlled throttle device comprising:
a body including a throttle valve;

a motor provided with a brush, the motor configured to drive the throttle valve;
a bracket configured to attach the motor to the body;
a pigtail connected electrically to the brush, and arranged on a surface of the bracket, the surface facing the motor; and
a filter circuit connected electrically to the pigtail, and configured to reduce a noise of the motor,
wherein
the filter circuit is arranged on a surface of the bracket, the surface opposite the motor,
the filter circuit is disposed to overlap the pigtail across the bracket when viewed in an axial direction of the motor,
the filter circuit includes an inductor connected electrically to the pigtail, and
the inductor is disposed to overlap the pigtail across the bracket when viewed in the axial direction of the motor.

2. The electronically controlled throttle device according to claim 1, wherein
the filter circuit includes a capacitor connected electrically to the pigtail, and a resistor connected electrically to the pigtail, and
each of the capacitor and the resistor is arranged on the surface of the bracket, the surface facing the motor.

3. The electronically controlled throttle device according to claim 1, wherein
the filter circuit includes a capacitor connected electrically to the pigtail, and a resistor connected electrically to the pigtail, and
each of the capacitor and the resistor is arranged on the surface of the bracket, the surface opposite the motor.

4. The electronically controlled throttle device according to claim 1, further comprising:
a first gear attached to one end of a shaft of the motor;
a throttle shaft to which the throttle valve is attached;
a second gear attached to one end of the throttle shaft; and
a third gear configured to transmit rotation of the first gear to the second gear,
wherein the inductor is located opposite the third gear across the shaft of the motor.

5. An electronically controlled throttle device comprising:
a body including a throttle valve;
a motor provided with a brush, the motor configured to drive the throttle valve;
a bracket configured to attach the motor to the body;
a pigtail connected electrically to the brush, and arranged on a surface of the bracket, the surface facing the motor; and
a filter circuit connected electrically to the pigtail, and configured to reduce a noise of the motor, wherein
the filter circuit is arranged on a surface of the bracket, the surface opposite the motor,
the pigtail includes a first pigtail and a second pigtail,
the filter circuit includes a first inductor connected electrically to the first pigtail, and a second inductor connected electrically to the second pigtail,
the first inductor and the second inductor are arranged in a V-shape on the surface of the bracket, the surface opposite the motor,
the first pigtail is disposed to overlap the first inductor from one end to the other end of the first inductor across the bracket in an axial direction of the motor, and
the second pigtail is disposed to overlap the second inductor from one end to the other end of the second inductor across the bracket in an axial direction of the motor.

6. The electronically controlled throttle device according to claim 5, wherein
the first pigtail is connected to an end of the first inductor that is closest to the second inductor, and
the second pigtail is connected to an end of the second inductor that is closest to the first inductor.

* * * * *